US012496661B2

United States Patent
Beals et al.

(10) Patent No.: US 12,496,661 B2
(45) Date of Patent: Dec. 16, 2025

(54) METHOD OF REMOVAL OF HEAT CHECKING

(71) Applicants: MAGNA INTERNATIONAL INC., Aurora (CA); Randy S. Beals, Grand Ledge, MI (US); John Richard Potocki, Armada, MI (US)

(72) Inventors: Randy S. Beals, Grand Ledge, MI (US); John Richard Potocki, Armada, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 1188 days.

(21) Appl. No.: 17/423,530

(22) PCT Filed: Jan. 15, 2020

(86) PCT No.: PCT/US2020/013621
§ 371 (c)(1),
(2) Date: Jul. 16, 2021

(87) PCT Pub. No.: WO2020/150309
PCT Pub. Date: Jul. 23, 2020

(65) Prior Publication Data
US 2022/0088716 A1   Mar. 24, 2022

Related U.S. Application Data

(60) Provisional application No. 62/793,113, filed on Jan. 16, 2019.

(51) Int. Cl.
*B23K 26/362* (2014.01)
*B23K 26/082* (2014.01)
(Continued)

(52) U.S. Cl.
CPC .......... *B23K 26/362* (2013.01); *B23K 26/082* (2015.10); *B25J 11/005* (2013.01); *B25J 19/02* (2013.01)

(58) Field of Classification Search
CPC .... B23K 26/362; B23K 26/082; B25J 11/005; B25J 19/02; B23P 6/00; B22D 19/10
See application file for complete search history.

(56) References Cited

U.S. PATENT DOCUMENTS 4,620,353 A * 11/1986 Pryor ..................... B22D 46/00
164/4.1
6,615,470 B2   9/2003 Corderman et al.
(Continued)

FOREIGN PATENT DOCUMENTS

CN   105522155 A *  4/2016
EP   0740976 A1   11/1996
(Continued)

OTHER PUBLICATIONS

Extended European Search Report mailed Aug. 2, 2022 for European Application No. 20742116.5, 10 pages.

*Primary Examiner* — Brian W Jennison
*Assistant Examiner* — Kristina J Babinski
(74) *Attorney, Agent, or Firm* — Dickinson Wright PLLC

(57) ABSTRACT

A system for removing a heat check feature on an aluminum casting formed by a high pressure die casting process is provided. The system includes a laser source, a robotic arm, and a heat check sensor. The heat check sensor develops a surface profile of at least part of the casting and transmits heat check feature information to the laser source to project the beam of laser light thereon. The projection of the beam of laser light can be varied in time and power, which can depend on surface profile information obtained from the sensor. Once at least a portion of the heat check feature is removed, the casting is placed against another part such that
(Continued)

the joint interface is primarily the portion where the heat checking has been removed. Self-piercing rivets are then driven into the casting and the part to permanently join them together.

19 Claims, 11 Drawing Sheets

(51) Int. Cl.
    *B25J 11/00*     (2006.01)
    *B25J 19/02*     (2006.01)

(56) References Cited

U.S. PATENT DOCUMENTS

| | | |
|---|---|---|
| 7,169,242 B2 | 1/2007 | Fernihough et al. |
| 8,726,501 B2 | 5/2014 | Schoonover et al. |
| 10,106,876 B2 | 10/2018 | Tuppen et al. |
| 2005/0143861 A1 | 6/2005 | Watanabe et al. |
| 2017/0355008 A1* | 12/2017 | Potocki ................ B21D 39/00 |

FOREIGN PATENT DOCUMENTS

| | | | |
|---|---|---|---|
| EP | 3345695 A1 | 7/2018 | |
| JP | 2010207884 A | 9/2010 | |
| WO | WO-2018127425 A1 * | 7/2018 | ............. B22D 19/16 |

\* cited by examiner

METHOD OF REMOVAL OF HEAT CHECKING

CROSS-REFERENCE TO RELATED APPLICATIONS

This U.S. National Stage Patent Application claims the benefit of PCT International Patent Application Serial No. PCT/US2020/013621 filed Jan. 15, 2020 entitled "METHOD OF REMOVAL OF HEAT CHECKING" which claims the benefit of and priority to U.S. Provisional Patent Application Ser. No. 62/793,113, filed Jan. 16, 2019, titled "Method Of Removal Of Heat Checking," the entire disclosure of which is hereby incorporated by reference.

BACKGROUND OF THE INVENTION

1. Field of the Invention

The present invention relates to a system of removing heat checking. More particularly, the present invention relates to a system and method of removing heat checking from a casting surface with a beam of laser light.

2. Related Art

This section provides background information related to the present disclosure which is not necessarily prior art.

While the casting process is widely adopted method of forming useful articles (castings), it suffers certain drawbacks. One common problem with the casting process is thermal fatigue caused by the development of heat checks (die checking), which occurs when tensile stresses act upon a surface layer of the casting as molten material solidifies inside a die. Heat checks are veins or cracks on the surface layer (typically of H13 or P20 tool steel) that ultimately make the exterior surface deteriorated for decreased workability. Traditionally, the casting processes includes placing molten material within a die cavity and then cooling the molten material until it solidifies into the shape of the die cavity. Heat checking occurs proportionally with the rate at which the various layers of the casting cools from a superheated temperature. The casting temperature remains relatively stable and cools slowly, whereas the layers closest to the surface experience rapid cooling and contraction. The heat check feature is typically around 0.06 of an inch but can vary by changing the casting cycle and die lubrication times. The heat check creates positive "fins" of aluminum on the casting that reduces aesthetics and workability with mating surfaces and thus generally requires removal.

In efforts to remove the heat check feature, mechanical grinders have been developed that grind and sand the specific areas of the casting. Modernly, robots have been incorporated to operate the mechanical grinders wherein an operator can input a heat check feature depth and the robot will remove different amounts from different surfaces. While these robots have reduced the amount of time and physical labor, they have certain shortcomings such as opening up subsurface porosity, expensive capital investment, requiring significant floor space, and also being time intensive. Furthermore, aluminum powder is known to be flammable and explosive and thus requires special handling.

Accordingly, there is a continuing desire to develop and further refine processes that are capable of removing the heat check features to improve workability of a part with minimal time, expense, and floor space.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

According to one aspect of the disclosure, a method for removing a heat check feature from a casting is provided. The method comprises the steps of: providing a casting with a heat check feature, determining a location of the heat check feature, projecting a beam of laser light onto the heat check feature, and removing at least a portion of the heat check feature with the beam of laser light.

In accordance with another aspect of the disclosure, the subject invention provides an assembly for removing a heat check feature from a casting. The assembly comprises a robotic arm, a heat check sensor for scanning a casting for a heat check feature, and a control unit for receiving readings from the heat check sensor and developing a casting profile. The assembly further comprises a laser head connected to the robotic arm, wherein the control unit directs the laser head with the robotic arm to project a beam of laser light onto at least a portion of the heat check feature based on the casting profile.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DESCRIPTION OF THE ENABLING EMBODIMENT

Example embodiments will now be described more fully with reference to the accompanying drawings. In general, the subject embodiments are directed to a system and process of removing heat checking from a casting surface by projecting a beam of laser light thereon. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the system and process of removing heat checking from a casting surface with a beam of laser light is shown to improve efficiency and accuracy. More particularly, the subject heat checking removal system 20 and process include determining the presence of heat checking on the surface of a recently casted part and selectively removing the heat check feature with the beam of laser light.

Figure 1A:
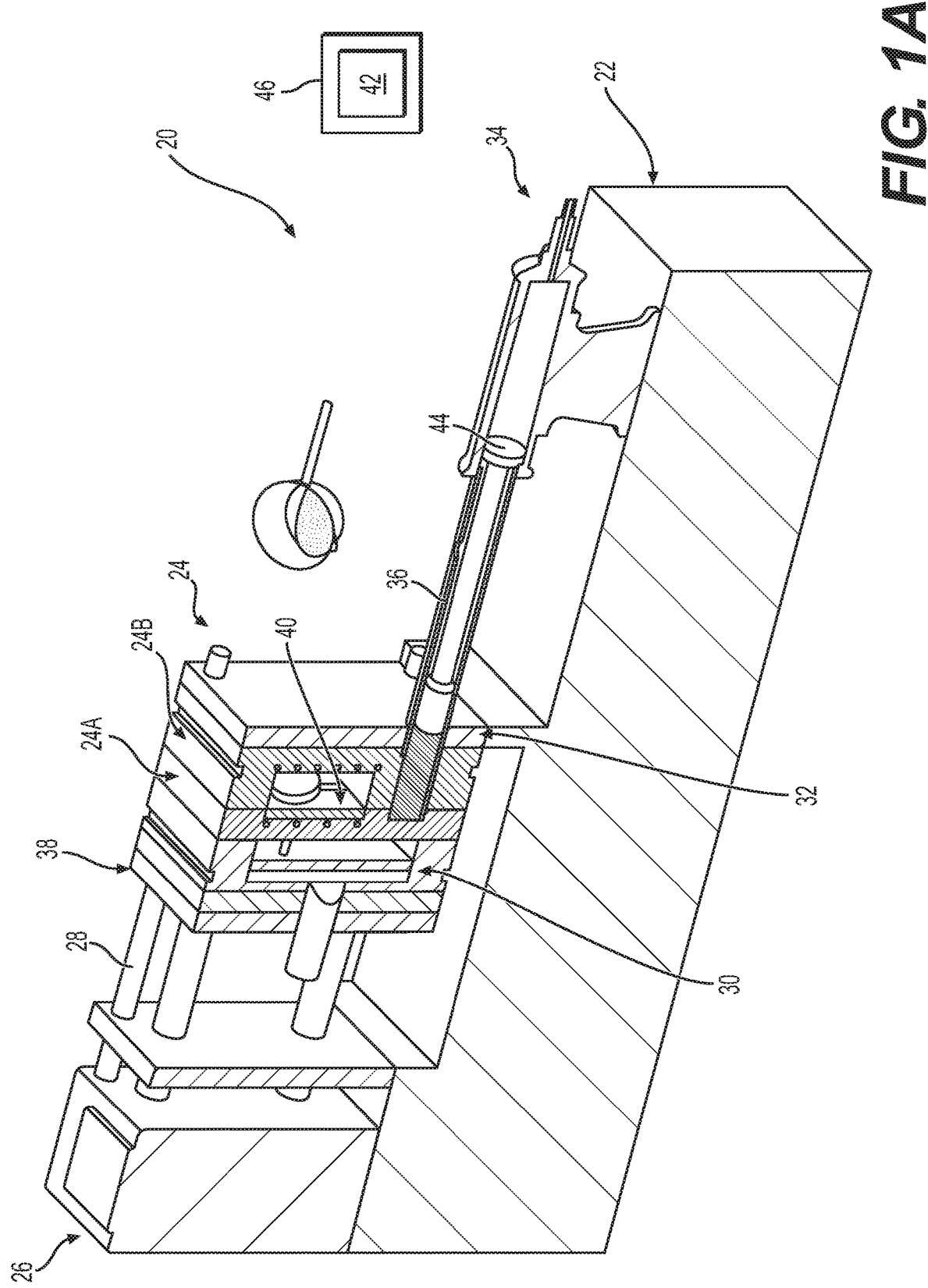
FIG. 1A is a cross-section view of an exemplary cold chamber high pressure casting machine used with a heat checking removal system.

The heat checking removal system 20 may include a casting assembly 22 for initially forming the casting. A perspective view of an exemplary casting assembly 22 is shown in FIG. 1A. More particularly, the exemplary casting assembly 22 is illustrated as a cold chamber high pressure die casting assembly 22. The casting assembly 22 includes a mold 24 having an ejector half 24A and a cover half 24B. The cover half 24B and ejector half 24A move relative to one another and can be sealed together to form a cavity 40 therebetween. The cavity 40 defines the shape of the desired casting. Movement of the ejector half 24A and the cover half 24B is controlled by a clamping unit 26.

The clamping unit 26 includes a moveable platen 38 that moves towards and away from a stationary platen 32. The ejector half 24A includes an ejector plate 30 that moves with the moveable platen 38. The moveable platen 38 travels along one or more tie bars 28. Molten material may be initially stored in a furnace (not shown) and later fed into an injection assembly 34, whereafter it is injected into the cavity 40. The injection assembly 34 may include a sleeve 36 and a plunger 44 that pushes molten material therethrough and into the cavity 40. Cooling channels 48 may be located in to the mold 24. In operation, the furnace holds molten material until it is ready to be injected into the cavity 40 by the injection assembly 34. The molten material is then cooled until it solidifies into a desired shape or casting 42 and an outer heat check feature 46. Cooling may be expedited through a the cooling channels 48, however, the closer the cooling channels 48 are located to the molten material and the faster the adjacent molten material is cooled, the more the heat check feature 46 develops on the casting 42 (see FIGS. 1B and 1C). Removal of the casting 42 is facilitated by movement of the ejector plate 30. After removal, further quenching and treatment steps may be employed before removal of the heat check feature 46.

Figures 1B, 1C:
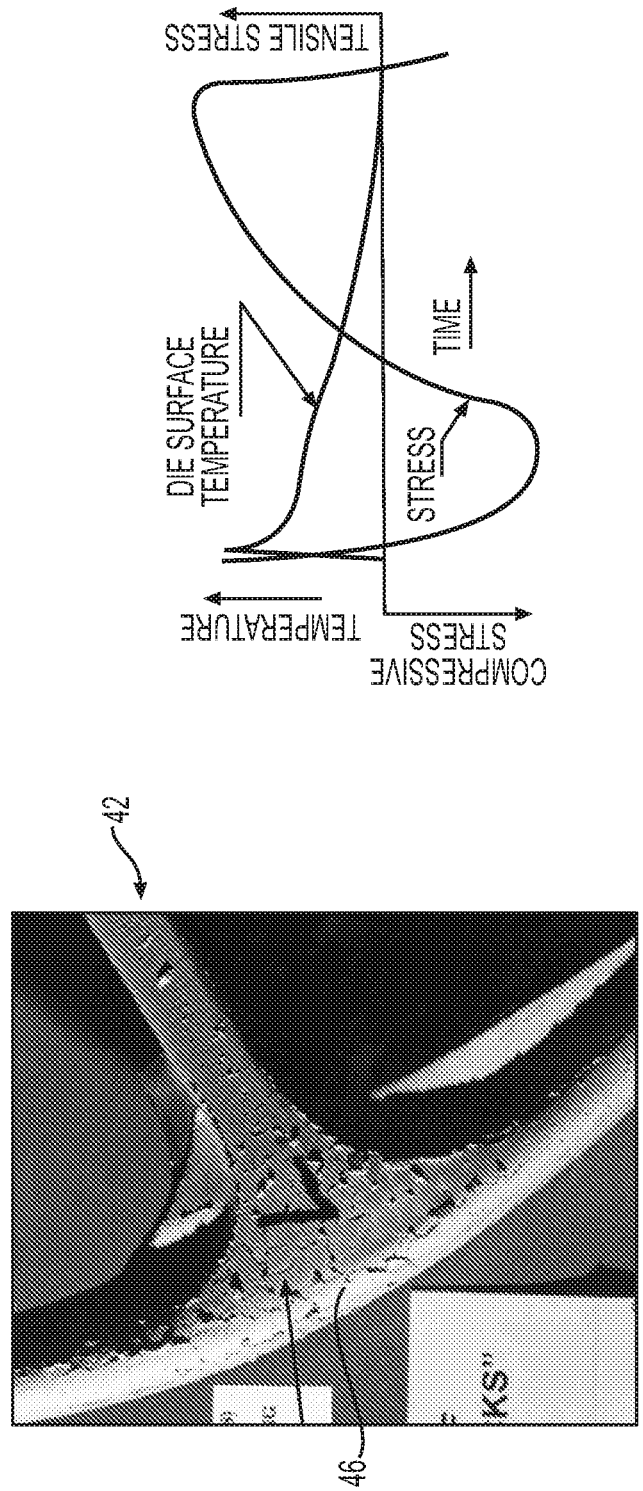
FIG. 1B is a plan view of a casting having a heat check feature.
FIG. 1C is a graphical representation of surface stresses on the casting resulting from cooling that relate to increased heat check feature.
Figure 1D:
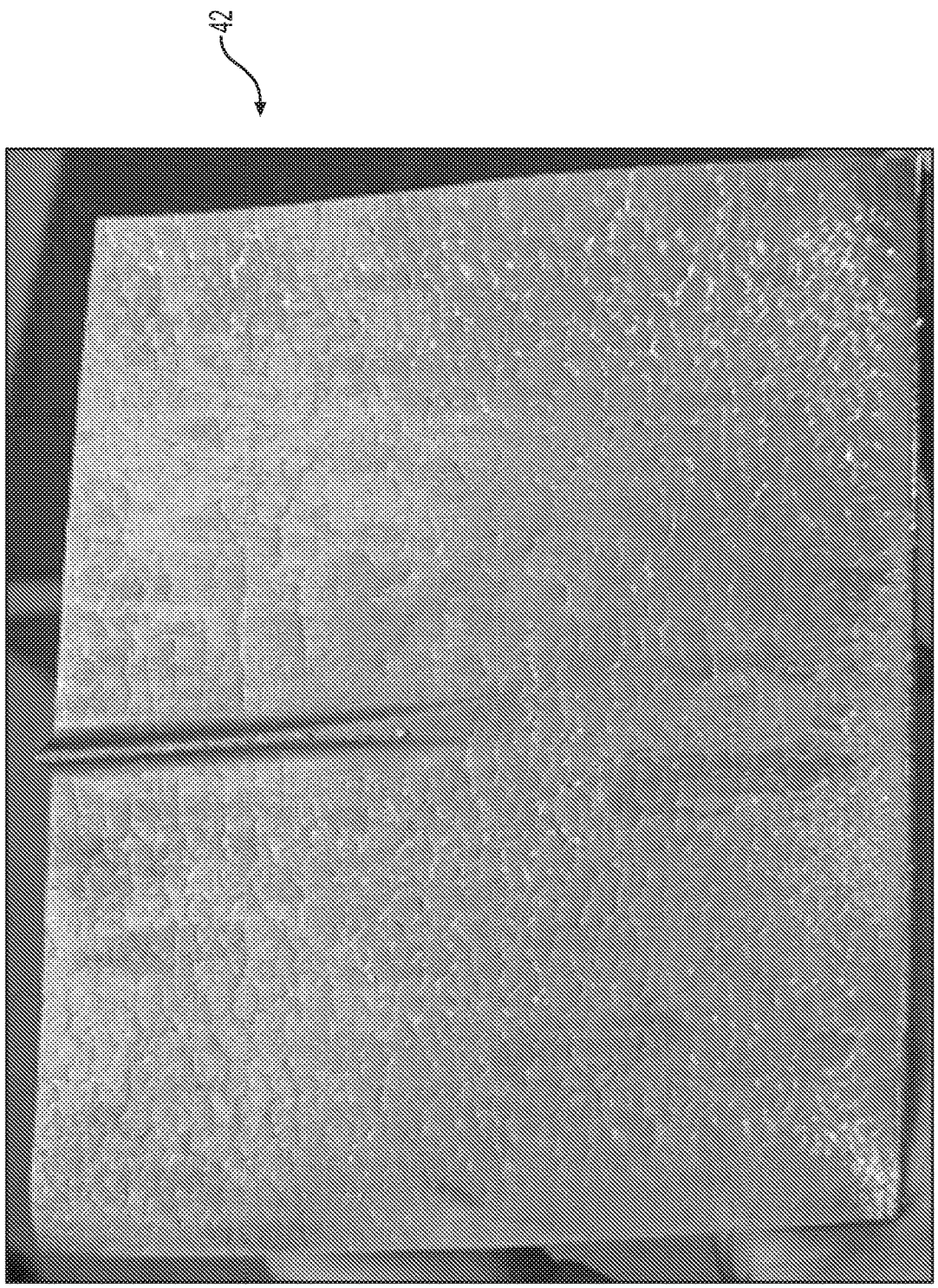
FIG. 1D is a plan view of another casting with a heat check feature.
Figure 1E:
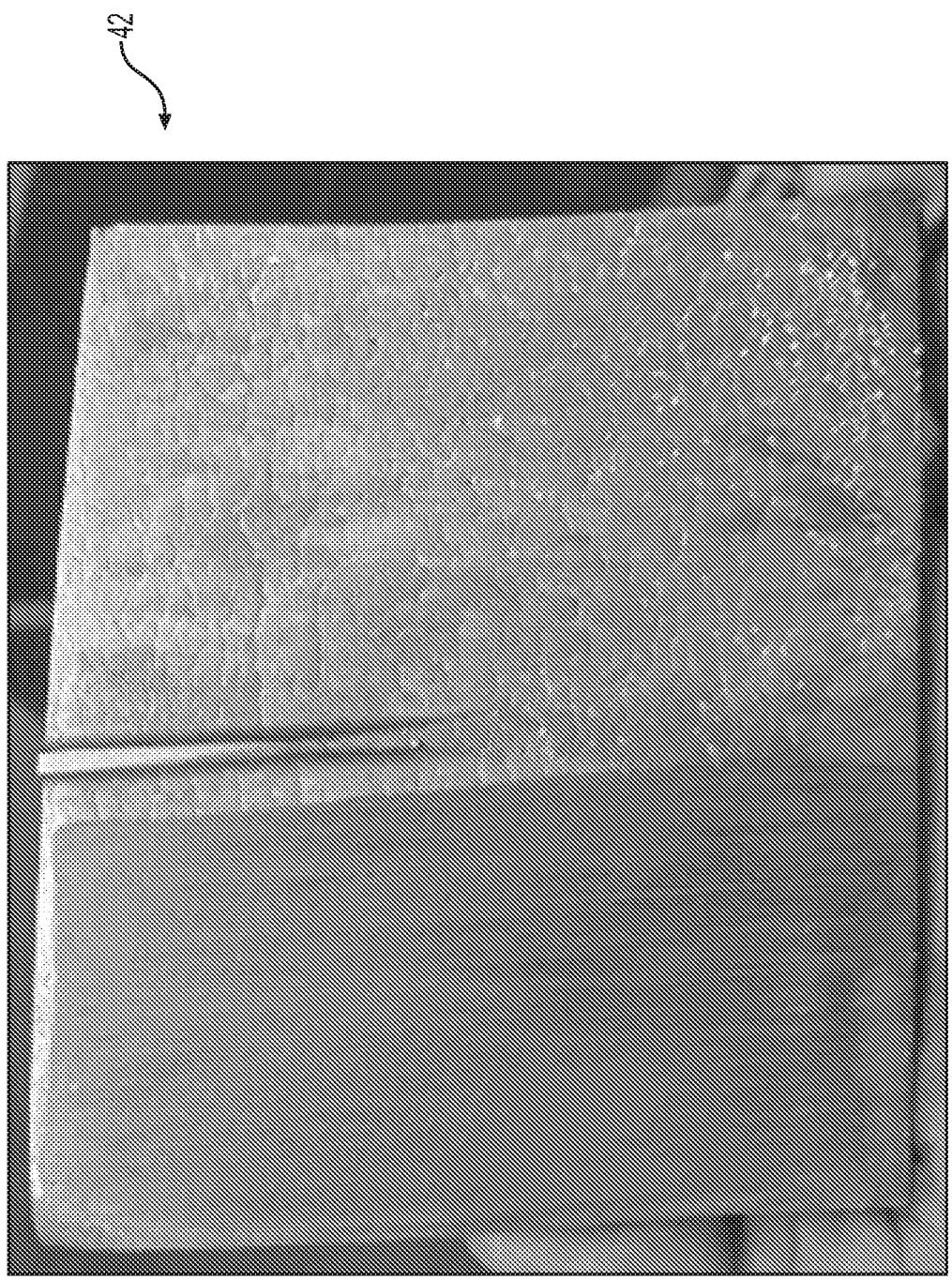
FIG. 1E is a plan view of the casting from FIG. 1D wherein the heat check feature has been partially removed by a grinding operation.

Description of the casting assembly 22 is exemplary in nature and may further utilize a high pressure die cast system (HPDC) to rapidly cool the molten material, as described in International Application No. PCT/US19/32099, entitled "Direct Chill Permanent Mold Casting System and Method of Same," which is incorporated herein by reference. An enlarged view of the heat check feature 46 on a casting 42 is illustrated in FIG. 1B. The heat check feature 46 includes splits and channels extending into the surface of the casting 42. FIG. 1C is a graphical representation of compression and tensile stress within the casting resulting from cooling as a function of time, wherein faster cooling and increased stresses cause larger heat check features 46 that detract from athletics and workability. Another example casting 42 is shown in FIG. 1D, which may be formed from Aural-2 Aluminum Alloy. The example Aural-2 casting 42 has a thickness of 2.92 mm and the die has a heat check feature extends into the surface of the cavity at a depth of approximately 0.22 mm. Conventionally, this heat check feature transfers to the casting whereafter it is removed by a time-intensive grinding operation as shown in FIG. 1E. After the grinding operation, approximately 0.07 mm of the casting surface is removed such that the final thickness is approximately 2.85 mm and the casting suffers the afore described shortcomings including a porous surface.

Figure 2A:
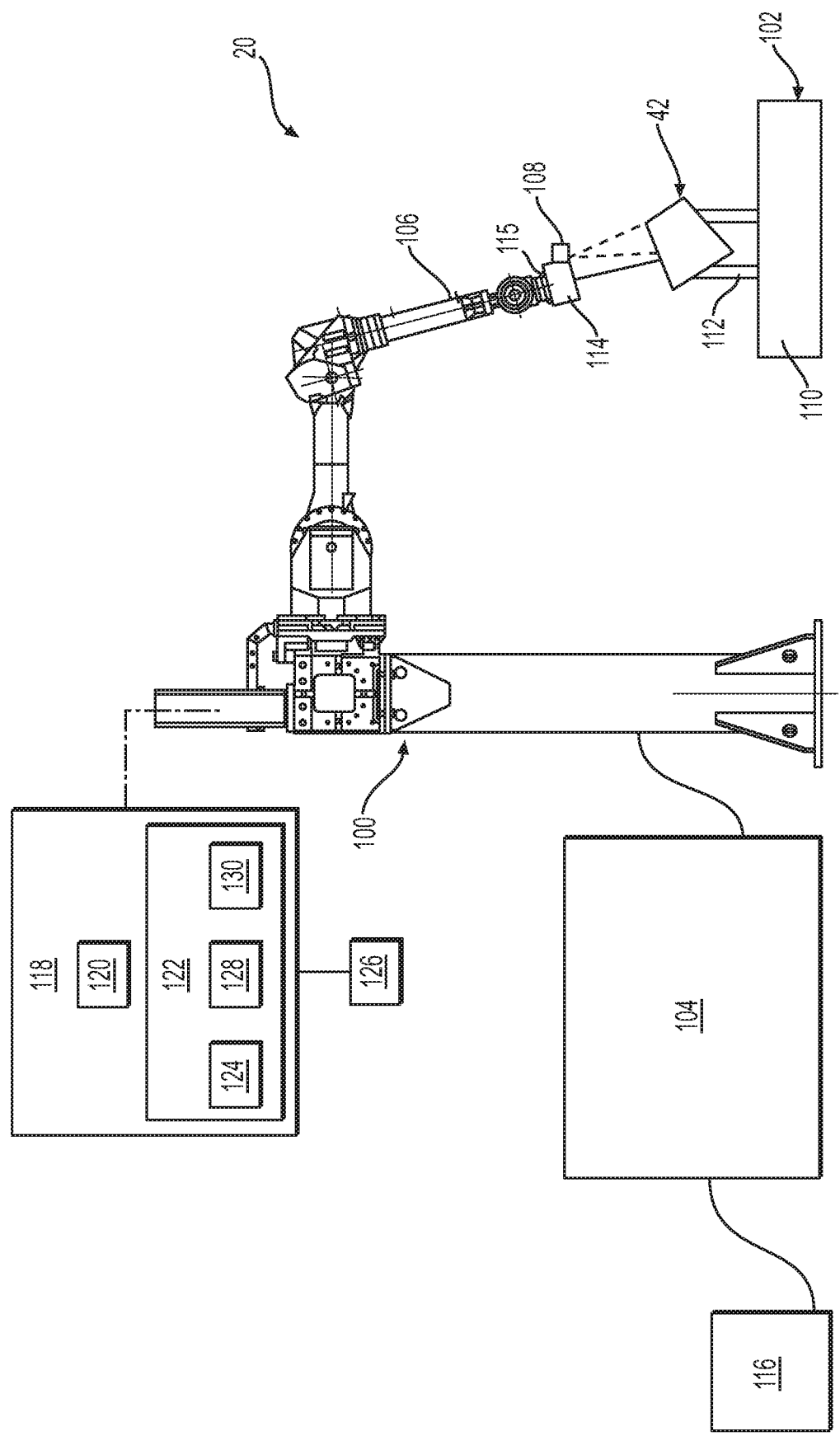
FIG. 2A is a side view of the heat checking removal system including a robotic arm and a laser.

Referring now to FIG. 2A, the heat checking removal system 20 includes a heat check removal assembly 100 that provides an improved heat check feature 46 removal over that illustrated in FIG. 1E. The heat check removal assembly 100 comprises a casting holding fixture 102, a laser source 104, a robotic arm 106, and a heat check sensor 108. Once the casting 42 has been cooled to solidification, ejected, and quenched, it is placed in the casting holding fixture 102. The casting holding fixture 102 preferably is configured to make limited contact with the casting 42 such that a heat check feature 46 removal operation can be applied to as much of the casting 42 as possible without interruption from the casting holding fixture 102. In one embodiment, the casting holding fixture 102 includes a base 110 and a at least one arm 112 arranged to hold the casting 42 at specific and predetermined points. The at least one arm 112 may include a plurality of thin arms 112. Once the casting 42 has been placed in the casting holding fixture 102, the heat check sensor 108 provides a surface profile of the casting 42 to determine areas and the depth of the heat check feature 46. The heat check sensor 108 may be operational during the heat checking removal operation to provide real-time or updated readings to ensure the entire heat check feature is removed. Once a profile has been developed, the laser source 104 includes a laser head 114 that focuses the beam of laser light onto the various predetermined heat check feature 46 locations. The laser head 114 is attached to and directed by the robot arm 106 based on profile readings from the heat check sensor 108. At least one power source 116 provides electrical energy to the various components of the heat checking removal system 20. The laser head 114 can also include a fiber-optic cable between the laser source 104 and the laser head 114. Alternatively, the laser source 104 may also be attached to the laser head 114 within a same housing. The laser head 114 may include a one or more lenses and mirrors and the laser source 104 may include other components to develop the initial beam of laser light. The laser head 114 may be removably attached to the robot arm 106 via a mounting bracket 115. A control unit 118 communicates with the heat check sensor 108, the robotic arm 106, and the laser source 104, and directs the laser head 114 towards the heat check feature 46 locations.

The control unit 118 may be configured such that the operation of the heat check removal assembly 100 is at least partially automated. More particularly, the control unit 118 may include a processor 120 and a memory 122 having machine readable non-transitory storage. Programs and/or software 124 (such as Arduino IDE, Windows, Linux, Android, iOS) may be saved on the memory 122 for carrying out instructions. In addition to automated software 124, a user interface 126 may be in communication with the control unit 118 for providing input data 128 or instructions for operation of the heat check removal assembly 100. In addition to the software 124 and input data 124, profile data 130 transmitted via the heat check sensor 108 may also be saved on memory. These various elements provided in conjunction with the control unit 118 allow for a specific implementation. Thus, one of ordinary skill in the art of electronics and circuits may substitute various components to achieve a similar functionality. In operation, certain values may be initially set with user interface 126, for example, the material of the casting, the shape of the casting, or a predetermined removal depth per pass of the beam of laser light. Next, the heat check sensor 108 scans the casting and develops profile data 130. The control unit 118 then directs the robotic arm 106 to move the beam of laser light over areas of the casting 42 that have been identified to have heat check features 46. After passage of the beam of laser light, the heat check sensor 108 may take a second profile to ensure that the heat check feature levels meet a quality threshold. In addition, once the heat check feature presence is at a threshold low amount, the control unit 118 may reduce the power or intensity of the beam of laser light for a final pass to provide a smooth finished surface. Depending on the depth of the heat check feature 46, the control unit 118 may increases the power of the laser head 114 via increased output from the power source 116 or slow the movement of the robotic arm 106 to increase the amount of time the laser head 114 is applied to the heat check feature 46. The control unit 118 may also instruct the projection of the beam of laser light to be pulsed to effectively dislodge the heat checking in certain instances.

The heat check sensor 108 may be attached or separate from the robotic arm 106. The heat check sensor 108 may develop a real-time profile simultaneously as the laser head 114 directs the beam of laser light to remove the heat check feature 46. For example, the heat check sensor 108 may take an initial measurement to develop a first profile and, after or during the projection of the beam of laser light, take a second profile of locations where the heat check feature 46 has been at least partially removed by the beam of laser light to determine if there has been adequate removal within a predetermined threshold. The heat check sensor 108 determines both the location and the depth of the heat check feature 46 via the presence and the depth of surface cracks. For example, during scanning, the heat check sensor 108 may measure the distance between the heat check sensor 108 and the surface such that cracks provide reading of being located at a further distance from the heat check sensor 108. Once a location of heat check features 46 is discovered by heat check sensor 108, the control unit 118 directs the robotic arm 106 to project the beam of laser light via the laser head 114 on heat check feature 46 locations. This projection can be pulsed, uniform, or otherwise of varying strength. For example, the beam of laser light may be initially pulsed in order to dislodge the heat checking from casting and then uniform for smoothing out a surface of the casting 42. Further quenching and treatment steps may be employed after removal of the heat check feature 46.

Figure 2D:
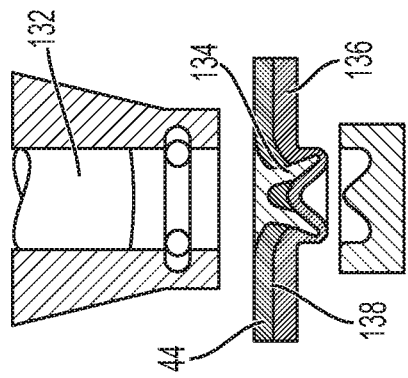
FIGS. 2C and 2D illustrate a self-piercing rivet being driven into a portion of the casting that has had the heat check feature removed and another part.
Figure 2C:
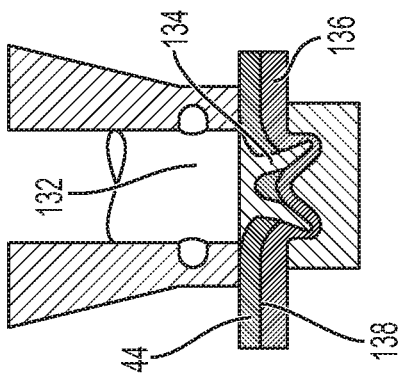
Figure 2B:
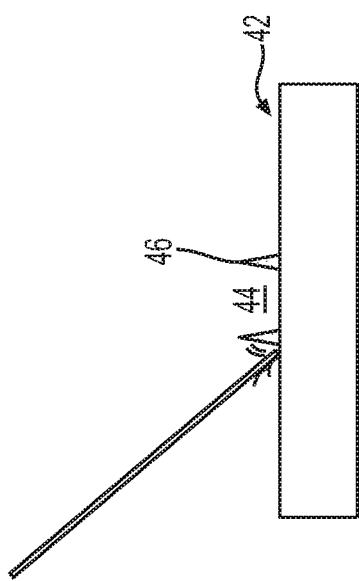
FIG. 2B is an enlarged view of the heat check feature being removed from the casting.
Figure 3A:
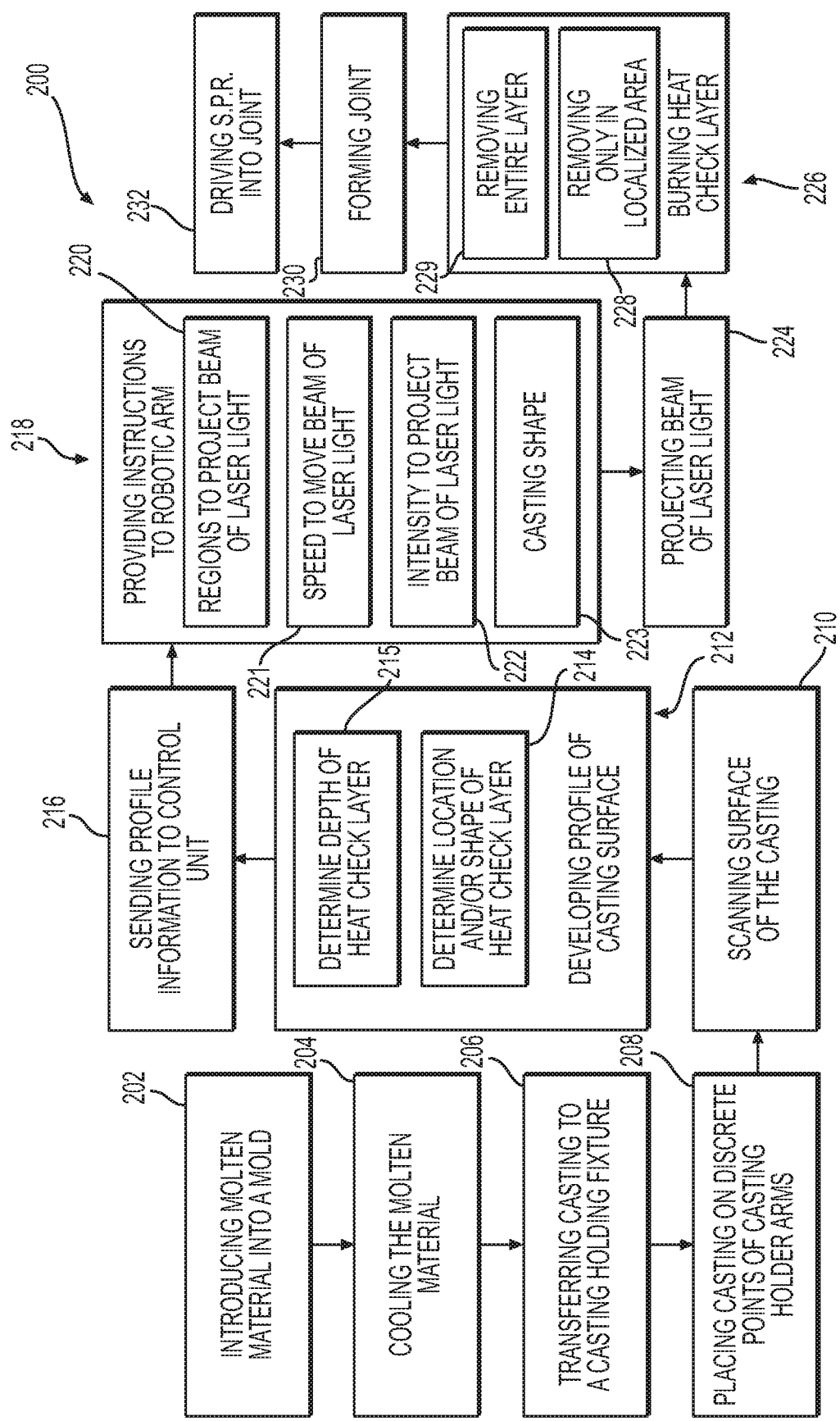
FIGS. 3A and 3B illustrate a computer simulation of thermodynamic fatigue of a cover half of a mold assembly.
Figure 3B:
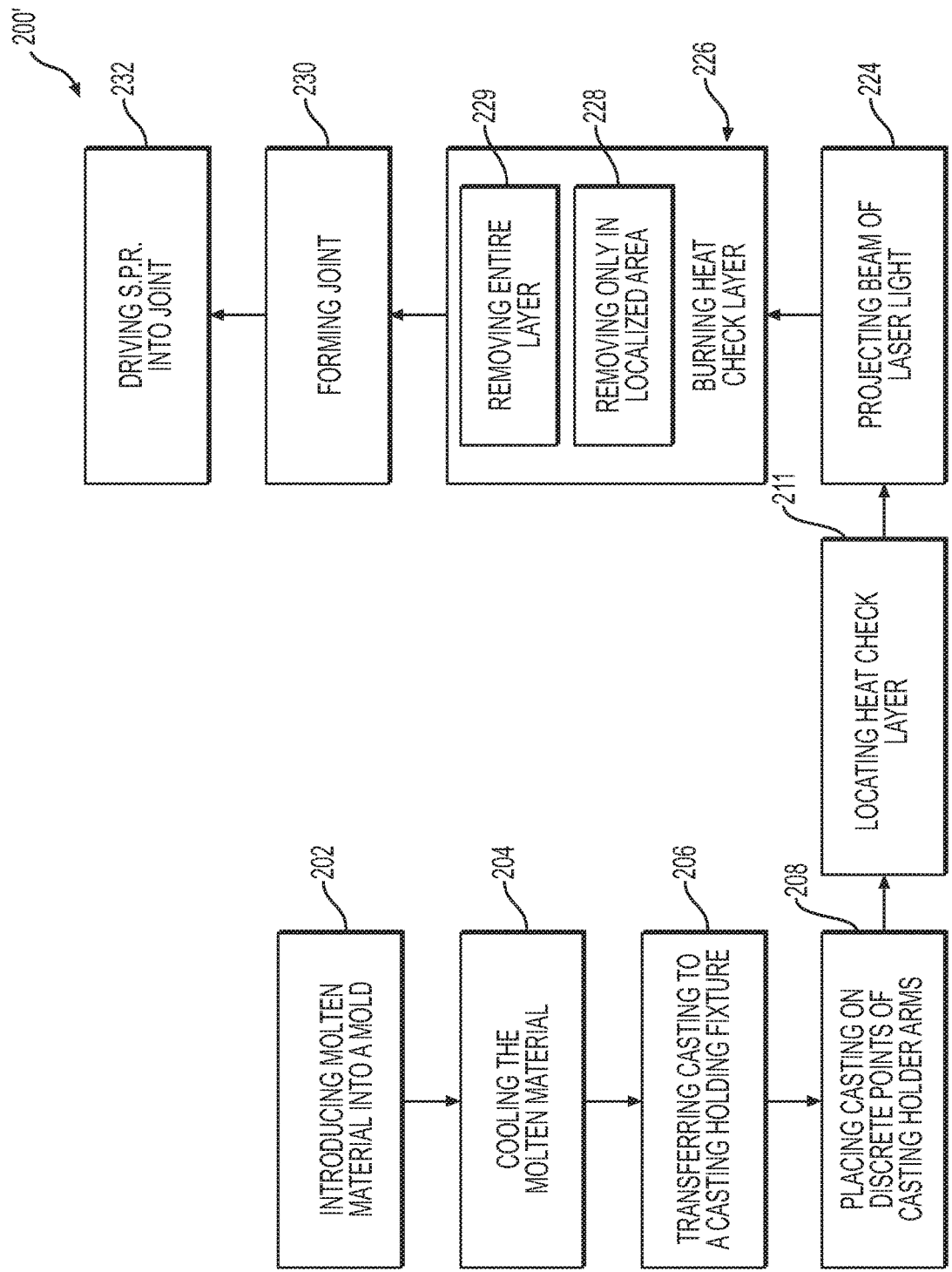
Figure 3D:
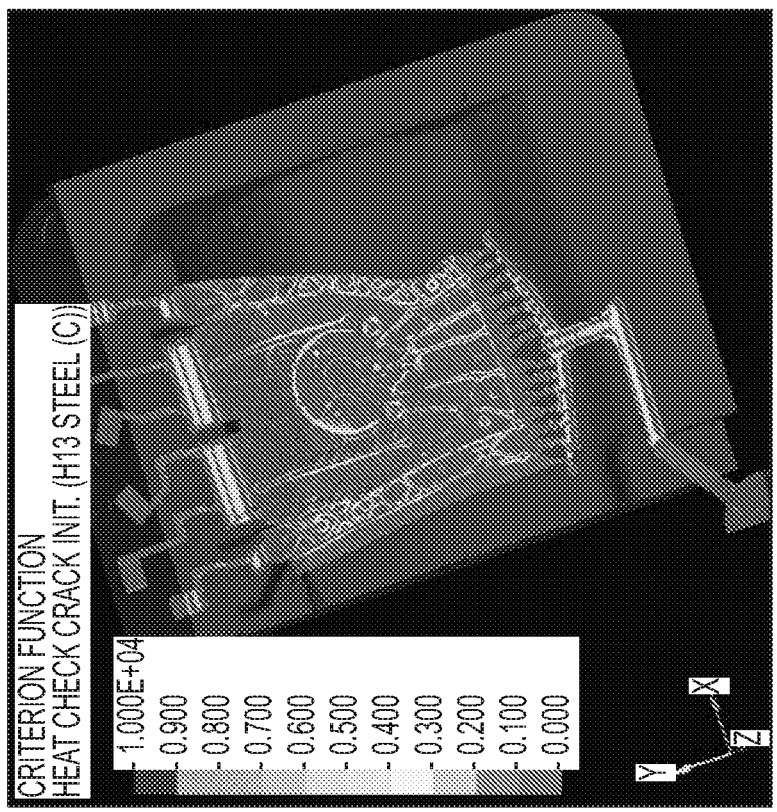
FIGS. 3C and 3D illustrate a computer simulation of thermodynamic fatigue of an ejector half of the mold assembly.
Figure 3C:
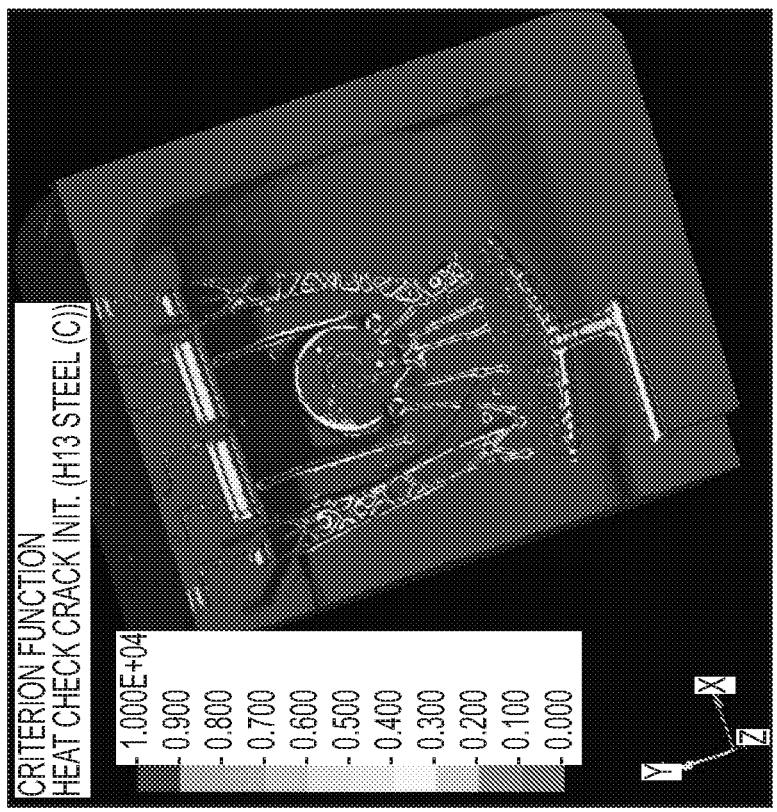

As best illustrated in FIGS. 2C and 2D, the heat check removal assembly 100 may further include a rivet driver 132 to drive self-piercing rivets (S.P.R.) 134 into the portion of the casting 42 where the heat check feature 46 has been removed. More particularly, an interface surface 138 between the casting 44 and a second part 136 may be initially determined before removing the heat check feature 46 at least on the interface surface 138. As such, the interface surface 138 is smooth and can sit flush against the second part 136 before connection therewith. In addition to the use of self-piercing rivets 132, other means of connection could be used including adhesive, fasteners, etc.

The laser head 114 is preferably a Fiber laser with a minimum 3 kilowatt beam of laser light output and is applied to the casting in a 100 μm diameter at a motion speed of 1 m/s. The beam of laser light output may be above 900 nm, above 1000 nm, between 900 nm to 1200 nm, between 1000 nm to 1100 nm, or at approximately 1064 nm. The laser source 104 may thus include a plurality of diode-laser pump modules for power scaling the beam of laser light output. While the casting 42 has been described as aluminum or aluminum alloy, the castings may also be formed of different materials. Similarly, while the casting process has been described as a high pressure die casting process "H.P.D.C.," other casting processes may be deployed without departure from the subject disclosure. It should also be appreciated that the laser source 104 and head 114 and interrelated parts can be provided as a cathode laser, a gas laser, a solid state laser, etc.

The heat check surface 46 can also be determined by advanced casting simulations of the mold 24 instead of the casting 44. FIGS. 3A through 3D show computer simulations of an x-ray analysis of thermodynamic fatigue on exemplary front shock tower tooling surfaces that cause heat checking. The computer simulations are based on empirical physics and can also be calibrated by overserving tool features. For example, in instances in which HPDC is utilized, the molten material enters the cavity with enough velocity to damages the walls. Based on a combinations of historical wear patterns, fluid dynamics, etc., an accurate model can be developed. With specific reference to FIGS. 3A and 3B, the cover half 24B is shown after a number of cycles showing crack initiation. Looking now to FIGS. 3C and 3D, the ejector half 24A is shown after a number of cycles showing additional problematic crack initiation. The different areas of the tooling presented in FIGS. 3A through 3D can be included in profile data 130 as problematic areas. Moreover, trends in profile data 130 taken from the heat check sensor 108 may be indicative of tooling fatigue. For example, if numerous castings exhibit localized areas affected by heat checking than others, such trends may be noted and communicated to a user via the user interface 126. The x-ray analysis may also be performed on the castings 44.

Figure 4A:
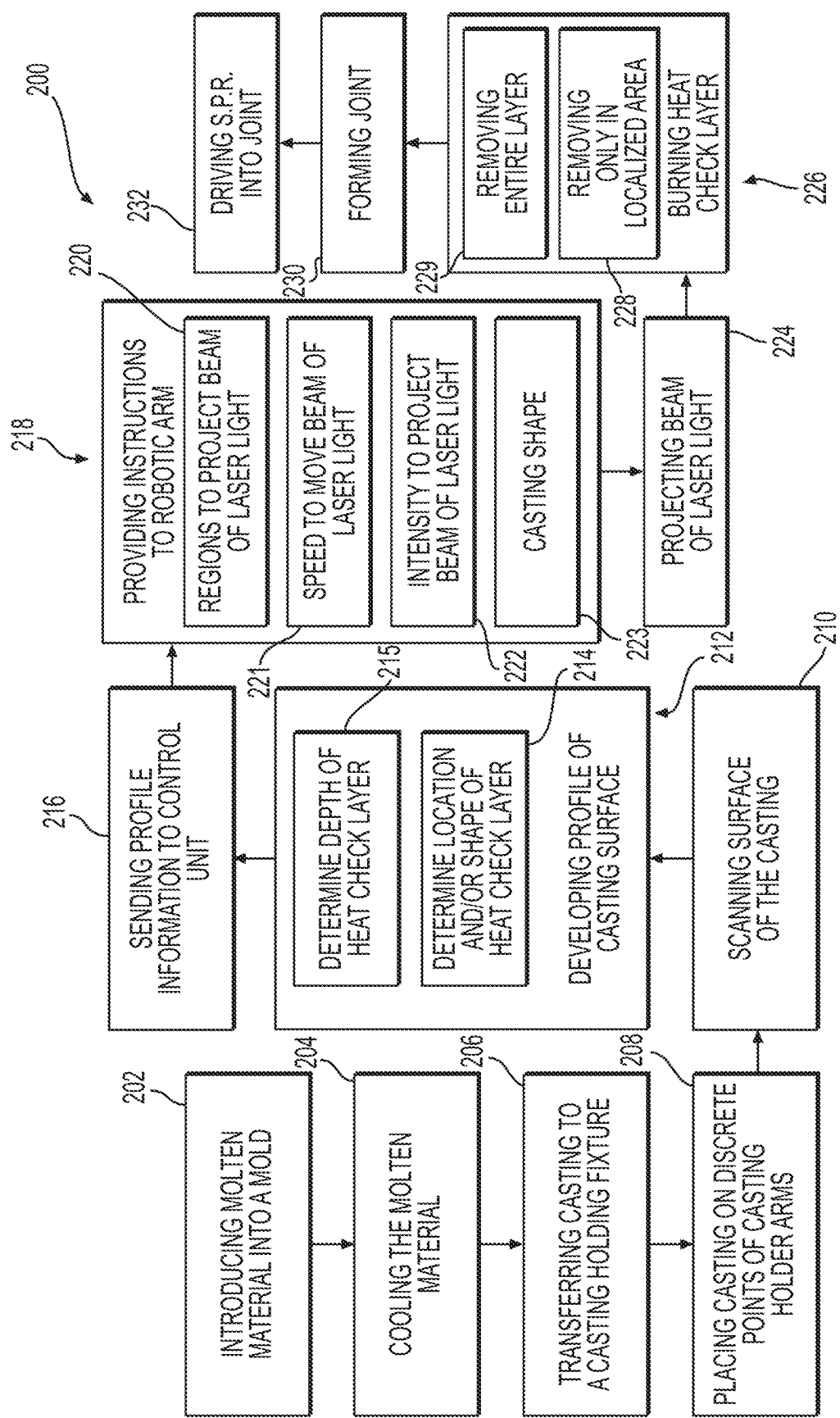
FIG. 4A is a method flow chart illustrating steps of removing the heat check feature with the heat checking removal system.

A process 200 of removing a heat check feature 46 is presented in FIG. 4A. The process 200 begins by introducing 202 molten material in a mold. The molten material is cooled 204 until it is at least partially solidified. Once the casting has solidified, it is transferred 206 to a casting holding fixture. The step of transferring the casting 206 can also include initially transferring the casting to a water quench tank off the die casting machine and afterwards placing it into a shear trim to remove any biscuit, gate, runner, and overflow. The step of transferring the casting 206 may also include performing an x-ray analysis on the casting or mold to developing a quality profile (see FIGS. 3A through 3D) before the part is transferred to a casting holding fixture. The casting is then placed 208 on discrete points of the casting holding fixture. After placement, a heat check sensor scans 210 the surface of the casting for heat check cracks to develop a profile 212 that includes the location of heat checking. Profile information may include inputs from a user interface as previously described. The heat check sensor may determine the location 214 and depth 215 of the heat checking and incorporate that information into the profile. Profile information is sent to a control unit 216 and may be saved in a local memory. Based on the profile, the control unit provides instructions 218 to a robotic arm to project a beam of laser light onto areas of the casting that have heat checking. The instructions can include projecting a pulsed, uniform, or varying strength beam of laser light. These instructions can include outlining where regions 220 the beam of laser light needs to be applied, providing a length of time or speed 221 that the beam of laser light needs to be applied to the surface, and providing a recommended power or intensity of the beam of laser light 222. These additional instructions can depend on profile data including the location of the heat checking, the shape 223 of the desired casting, and the depth of the heat check feature. The robotic arm then applies a beam of laser light 224 to the regions of heat checking and burns the heat check feature 226 until it is at least partially, substantially, or completely removed. For example, the beam of laser light may be initially pulsed in order to dislodge the heat checking from casting and then uniform for a constant surface. While these steps may be in chronological order, they can occur real-time as the heat checking sensor can be attached directly on the robotic arm to develop a profile on one area of the casting while the beam of laser light removes heat checking from another area of the casting, simultaneously. The step of projecting the beam of laser light may include using a diode laser to project a beam of laser light at 100 μm and 1 m/s at a 3 kilowatt power. The application step may further include pulsing the beam of laser light strength or intensity to effectively dislodge portions of the heat checking. The beam of laser light can be applied to the heat checking until the surface has aesthetic criteria (Ra) equal to 10. For certain applications, the projection of the beam of laser light and corresponding burning and removal of the heat check feature is only provided to certain areas of the casting. More particularly, the beam of laser light is only projected onto a localized area 228 that is predetermined based on a certain operational criteria. For example, when the casting is to be joined to another part, the contact area of the localized area of the casting (i.e., the joint) may be the only localized area to receive a beam of laser light projection. Once the heat checking is removed from the localized area, the casting placed over the part such that the localized area forms a majority of the joint 230 interface, with the joint being primarily flush contact. Self-piercing rivets (S.P.R.) are then driven 232 into either the part and/or the casting to join them together.

Figure 4B:
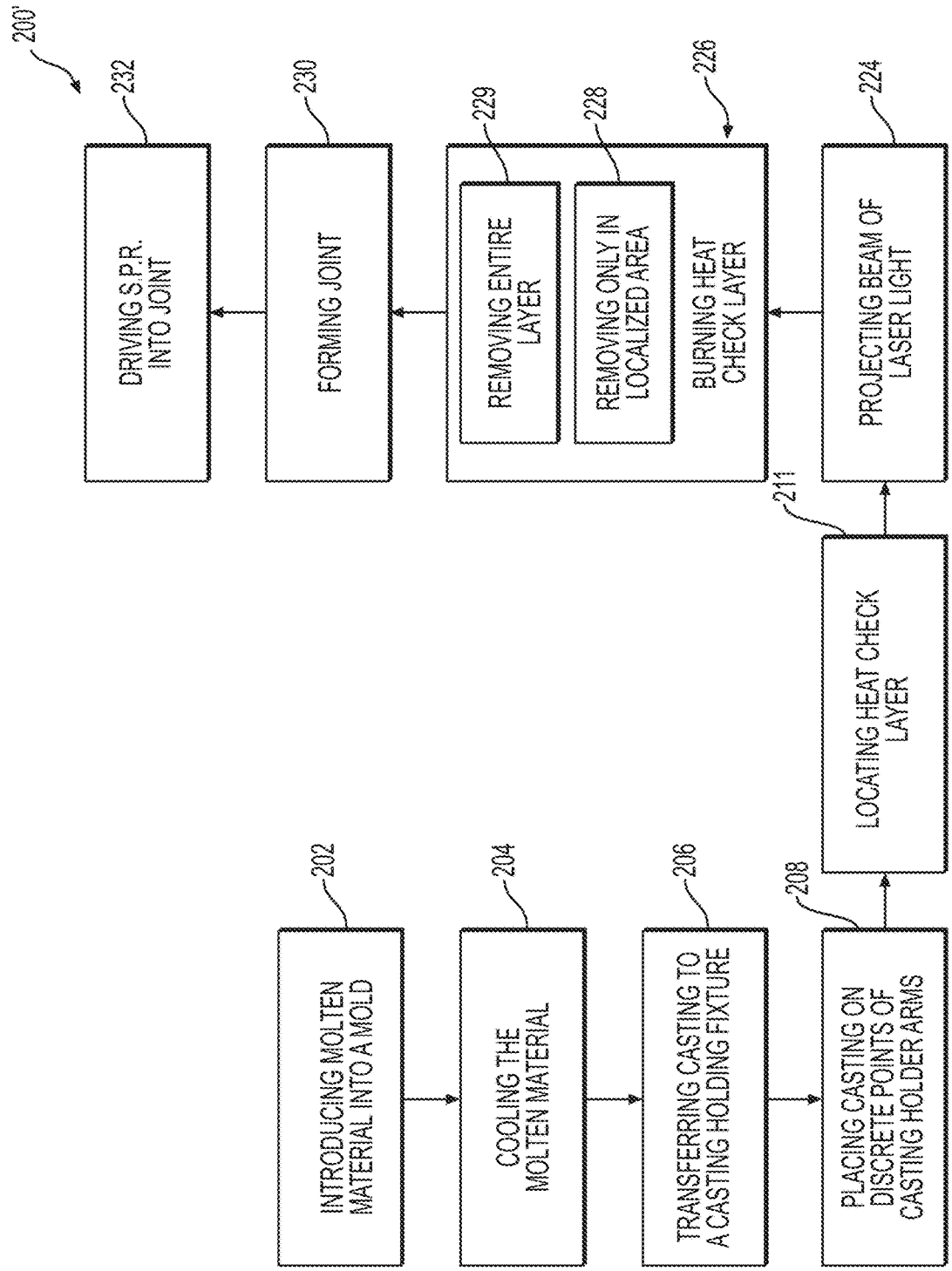
FIG. 4B is another method flow chart illustrating steps of removing the heat check feature with the heat checking removal system in accordance with another aspect.

Another method 200' is presented in FIG. 4B. The method 200' is similar to the method illustrated in FIG. 3A but does not include using a sensor to locate the heat check feature. Instead, the method 200' includes a step of checking or hypothesizing the heat check layer/feature 211 location with other means. The step of locating the heat check feature 211 can include associating the heat check locations based on previous castings, automatically projecting the beam of laser light to certain areas of the casting to remove a specific amount of surface, or may alternatively include other methods of locating the heat check feature 211 in order to direct the beam of laser light. These other methods can include visual or computer assisted locating (see FIGS. 3A through 3D). Moreover, the step of locating the heat check feature 211 may include initially forming the casting with excess thickness and using the beam of laser light to remove the excess thickness.

The casting may comprise of non-ferrous alloys such as aluminum, aluminum alloy, magnesium, or zinc.

In one embodiment illustrated in FIG. 5A, the aluminum alloy of the casting 42 comprises, in weight percent (wt. %) based on the total weight of the alloy: Silicon (minimum 9.5 wt. %, maximum 11.5 wt. %); Iron (no minimum, maximum 0.25 wt. %); Manganese (minimum 0.40 wt. %, maximum 0.60 wt. %); Magnesium (minimum 0.10 wt. %, maximum 0.60 wt. %); Strontium (minimum 0.010 wt. %, maximum 0.025 wt. %); Titanium (no minimum, maximum 0.12 wt. %); Aluminum; and other elements individually not more than 0.05 w. % and in aggregation not more than 0.15 w. %.

In yet another embodiment illustrated in FIG. 5B, the aluminum alloy of the casting 42 comprises, in weight percent (wt. %) based on the total weight of the alloy: Silicon (minimum 6.0 wt. %, maximum 8.0 wt. %); Iron (no minimum, maximum 0.25 wt. %); Manganese (minimum 0.40 wt. %, maximum 0.60 wt. %); Magnesium (minimum 0.10 wt. %, maximum 0.60 wt. %); Strontium (minimum 0.010 wt. %, maximum 0.030 wt. %); Titanium (no minimum, maximum 0.15 wt. %); Aluminum; and other elements individually not more than 0.05 w. % and in aggregation not more than 0.15 w. %.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A method for removing a heat check feature from a casting comprising the steps of:
providing a casting with a heat check feature;
determining a location of the heat check feature, wherein at least a portion of the heat check feature location is at a joint interface;
projecting a beam of laser light onto the heat check feature location;

removing at least a portion of the heat check feature which is located at the joint interface with the beam of laser light, and connecting the casting to another part at the joint interface and along the portion of the heat check location where the heat check feature has been removed by the beam of laser light.

2. The method of claim 1, wherein the step of determining the location of the heat check feature includes scanning the casting with a heat check sensor.

3. The method of claim 2, wherein the step of applying the beam of laser light includes moving the beam of laser light with a robotic arm.

4. The method of claim 3, wherein the step of scanning the casting includes moving the heat check sensor with the robotic arm.

5. The method of claim 1, further including changing the intensity of the beam of laser light based on the material used to form the casting.

6. The method of claim 1, further including providing the part and interfacing the part with the joint interface.

7. The method of claim 1, wherein the step of connecting the casting to the part at the joint interface includes driving at least one self-piercing rivet through the part and the casting.

8. The method of claim 1, wherein the step of projecting the beam of laser light includes varying at least one of the speed of travel or intensity of projection of the beam of laser light.

9. The method of claim 1, wherein the step of projecting the beam of laser light includes pulsating the intensity of the beam of laser light.

10. The method of claim 1, wherein the step of determining the location of the heat check feature includes observing the heat check feature locations on previous castings.

11. The method of claim 1, wherein the step of determining the location of the heat check feature includes determining the depth of the heat check feature.

12. The method of claim 1, wherein the step of providing the casting with the heat check feature includes placing the casting on a casting holding fixture that includes a plurality of arms.

13. An assembly for removing the heat check feature from the casting according to the method of claim 1, wherein the assembly comprises:
 the robotic arm;
 a heat check sensor for scanning the casting for the heat check feature;
 a control unit for receiving readings from the heat check sensor and developing a casting profile; and
 a laser head connected to the robotic arm, wherein the control unit directs the laser head with the robotic arm to project the beam of laser light onto at least the portion of the heat check feature based on the casting profile.

14. The assembly of claim 13, wherein the heat check sensor is located on the robotic arm.

15. The assembly of claim 13, wherein the casting profile includes a depth of the heat check feature.

16. The assembly of claim 13, wherein the laser head is configured to project the beam of laser light in a pulsating intensity.

17. The assembly of claim 13, further including a base with at least one arm for holding the casting with the heat check feature.

18. The assembly of claim 17, wherein the at least one arm includes a plurality of arms for holding the casting.

19. The assembly of claim 13, wherein the laser head is configured to project a beam of laser light of at least 3 kilowatts.

* * * * *